United States Patent [19]
Mowill

[11] Patent Number: 5,988,589
[45] Date of Patent: Nov. 23, 1999

[54] AIR VALVE ASSEMBLY INCLUDING SPLIT-SHAFT AND SEAL ARRANGEMENT

[76] Inventor: R. Jan Mowill, OPRA B.V. P.O. 838, 7550 AV, Henglo, Netherlands

[21] Appl. No.: 08/895,456

[22] Filed: Jul. 16, 1997

Related U.S. Application Data

[60] Provisional application No. 60/021,920, Jul. 17, 1996, provisional application No. 60/022,241, Jul. 22, 1996, and provisional application No. 60/030,313, Nov. 4, 1996.

[51] Int. Cl.$^6$ ...................................................... F61K 1/22
[52] U.S. Cl. ............................................ 251/305; 464/84
[58] Field of Search .................................. 251/306, 305; 464/84

[56] References Cited

U.S. PATENT DOCUMENTS

| | | | |
|---|---|---|---|
| 3,606,980 | 9/1971 | Simpson et al. | 251/305 |
| 4,373,542 | 2/1983 | Scaramucci | 251/306 X |
| 4,634,094 | 1/1987 | Geiser | 251/305 X |
| 4,901,979 | 2/1990 | Garrigues et al. | 251/306 |

*Primary Examiner*—John Fox
*Attorney, Agent, or Firm*—Finnegan, Henderson, Farabow, Garrett, and Dunner, L.L.P.

[57] ABSTRACT

An air valve assembly for use with a premixer for a gas turbine engine module. The air valve assembly includes a valve disk and a support plate having a valve aperture in which the valve disk is disposed for rotation, the support plate having aligned first and second shaft apertures through opposing support plate ends that define an axis of rotation of the valve disk. The assembly also has a first shaft having one end section rotatably supported in the first aperture and having another end section connected to the valve disk; a second shaft having one end section rotatably supported in and extending through the second shaft aperture and with a bearing end terminating outside the support plate, and also having another end section connected to the valve disk. The assembly further includes an actuator shaft having an engagement end in axial abutting contact with the second shaft bearing end; and a coupling interconnecting the second shaft and the actuator shaft for transmitting precise rotary motion therebetween, the coupling having high torsional rigidity and low axial rigidity. The assembly still further has a coupling housing surrounding the coupling, the second shaft bearing end, and the actuator shaft engagement end, and having an actuator shaft aperture through which the actuator shaft extends, and a seal disposed between the actuator shaft engagement end and the housing for preventing air flow past the actuator shaft through the actuator shaft aperture.

8 Claims, 4 Drawing Sheets

AIR VALVE ASSEMBLY INCLUDING SPLIT-SHAFT AND SEAL ARRANGEMENT

This application claims a right of priority to the following U.S. provisional applications: Application No. 60/021,920 filed Jul. 17, 1996 entitled AIR VALVE ASSEMBLY INCLUDING SPLIT-SHAFT AND SEAL ARRANGEMENT; Application No. 60/022,241 filed Jul. 22, 1996 entitled COMBUSTOR FOR ULTRA LOW EMISSIONS GAS TURBINE APPLICATIONS; and Application No. 60/030,313 filed Nov. 4, 1996 entitled AIR VALVE ASSEMBLY INCLUDING SPLIT-SHAFT AND SEAL ARRANGEMENT.

BACKGROUND OF THE INVENTION

This invention relates to air valve assemblies usable in gas turbine engines. Specifically, this invention relates to air valve assemblies utilized in premixers of the type having a rotatable-type air valve actuated by a shaft penetrating a pressure housing.

It is known from U.S. Pat. No. 5,377,483, for example, to utilize fuel/air premixers to provide a closely controlled fuel/air mixture in single stage combustors for gas turbine engines. The close control afforded by such combustor premixer systems results in controlled combustion temperatures and low levels of NOx, CO, and unburnt hydrocarbon emissions, as well as low losses due to the overall control of the compressed air inventory.

It is also known from U.S. Pat. No. 5,377,483 that the close control of the fuel/air ratio can be advantageously achieved through the use of an air valve. Preferably, the air valve should be located in the relatively "cool" part of the combustor system outside of the combustion chamber liner. This location for the premixer and the resident air valve can minimize or mitigate problems associated with differential thermal expansion and temperature-related stress and fatigue problems traditionally associated with a valve-type apparatus mounted directly on or within the combustion chamber liner.

However, the temperatures at the "cool" location of such premixers can still be elevated as a consequence of an adiabatic temperature rise of the compressed air being controlled, which can range to upwards of 600° C. Problems can still exist, therefore, in terms of the construction and operation of movable valve elements such as butterfly-type valve plates and their associated actuating shafts. Moreover, if the actuating shaft requires penetration of the main pressure vessel housing for the engine, adequate sealing must be provided to prevent the leakage of hot compressed air through the penetration past the shaft, both from a thermal efficiency standpoint and also for safety purposes. Still further, the actuator shaft arrangement must be capable of delivering precise angular control to the valve plate in order to achieve the desired close control of the fuel/air ratio of the mixture.

SUMMARY OF THE INVENTION

In view of the foregoing considerations and problems in the construction of known fuel/air premixers for gas turbine engines, the air valve assembly in accordance with the present invention comprises a valve disk and a support plate having a valve aperture in which the valve disk is disposed for rotation. The support plate has a first and second shaft aperture aligned through opposing support plate ends that define an axis of rotation of the valve disk. The assembly also has a first shaft having one end section rotatably supported in the first aperture and having another end section connected to the valve disk; a second shaft having one end section rotatably supported in and extending through the second shaft aperture and with a bearing end terminating outside the support plate, and also having another end section connected to the valve disk. The assembly further includes an actuator shaft having an engagement end in axial abutting contact with the second shaft bearing end; and a coupling interconnecting the second shaft and the actuator shaft for transmitting precise rotary motion therebetween, the coupling having high torsional rigidity and low axial rigidity. The assembly still further has a coupling housing surrounding the coupling, the second shaft bearing end, and the actuator shaft engagement end, and having an actuator shaft aperture through which the actuator shaft extends, and a seal disposed between the actuator shaft engagement end and the housing for preventing air flow past the actuator shaft through the actuator shaft aperture. Preferably, the coupling is a bellows or a plurality of leaf springs. Also, it is preferred that the actuator engagement end is flanged and that the seal is an annular face seal between the flanged end and the housing surrounding the actuator shaft aperture. It is still further preferred that the assembly include means biasing the second shaft bearing end into engagement with the actuator shaft end and, for a flanged actuator shaft end and annular face seal, biasing the flanged end against the face seal. It is also preferred that the assembly includes means for angularly preloading the second shaft about the axis of rotation.

Other aspects and advantages of the invention will be set forth in part in the description which follows, and in part will be apparent from the description, or may be learned by practice of the invention.

BRIEF DESCRIPTION OF THE DRAWINGS

The accompanying drawings, which are incorporated in and constitute part of the specification, illustrate preferred embodiments of the invention and, together with a description, serve to explain the principles of the invention.

In the drawings.

DESCRIPTION OF THE PREFERRED EMBODIMENTS

Reference will now be made to the present preferred embodiments of the invention, which are illustrated in the accompanying drawings.

The present invention is preferably utilized with a combustor system, such as the one made in accordance with the teachings in U.S. Pat. No. 5,377,483 (the complete disclosure of which is hereby incorporated by reference). Generally, the preferred engine module for which the present invention is designed includes a centrifugal compressor for supplying compressed air to a premixer system, an air valve for regulating the flow of compressed air, a single-stage combustor system in communication with the premixer system, and a venturi element for further mixing the fuel and compressed air and delivering the resulting mixture to a combustion zone within a combustor system.

Figure 1:
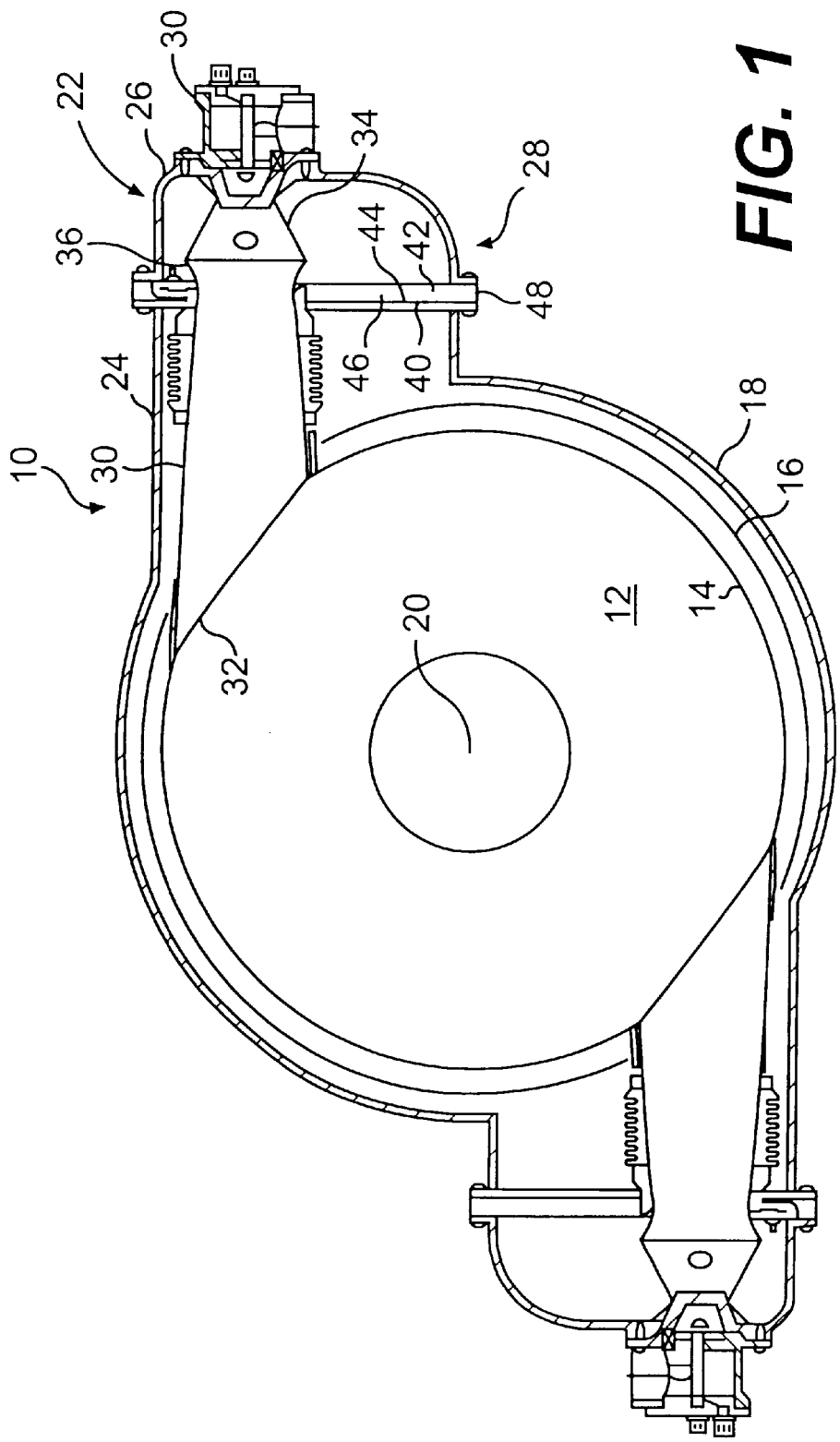
FIG. 1 is a cross-section of a combustor system that advantageously utilizes the present invention.

As embodied herein and with reference to FIG. 1, a combustor system is designated generally by the numeral 10. Combustor system 10 includes an annular combustion chamber 12 defined by a combustion chamber liner/housing 14. Around housing 14 is disposed in spaced relation, a cooling shroud 16 and a pressure housing 18, as would be understood from the disclosure in U.S. Pat. No. 5,377,483. Combustion chamber housing 14 is designed to surround a gas turbine spool assembly, which can include a radial turbine and a centrifugal compressor element (all not shown) for rotation about an axis 20.

FIG. 1 also shows a pair of premixers 22, each including premixer housing components 24, 26 interconnected to capture an air valve assembly 28, which is disclosed in more detail henceforth. Disposed within each premixer 22 is a mixing tube or venturi 30 having an exit 32 disposed to deliver a fuel/air mixture into combustion chamber 12 tangentially with respect to axis 20 for reasons detailed in U.S. Pat. No. 5,377,483. Also enclosed within premixer 22 is a perforated flow smoothing element 34 surrounding a venturi inlet 36 and also surrounding an outlet for a fuel nozzle assembly 38. Fuel nozzle assembly 38, which can be a multiport fuel nozzle accommodating different fuels (e.g., gas and liquid), delivers a spray of fuel into the venturi inlet region where it is mixed with compressed air flowing through the perforated screen member 34 in an amount controlled by the air valve assembly 28.

In accordance with the present invention, an air valve assembly comprises a valve disk and a support plate having a valve aperture in which the valve disk is disposed for rotation. The support plate has aligned first and second shaft apertures through opposing support plate ends that define an axis of rotation of the valve disk. As embodied herein, and with continued reference to FIG. 1, as well as FIG. 2, air valve assembly 28 is shown and includes a generally planar valve support plate 40 having an aperture 42 normal to the plane of support plate 40 and a butterfly-type valve disk 44 disposed in aperture 42 for rotation about an axis 46 by a shaft assembly 48.

Valve disk 44 is generally rectangular and elongated along the axis of rotation 46, but other shapes are possible. For example, a valve disk may have a circular shape, or may involve a cylindrical configuration for regulating the flow of compressed air. Valve disk 44 is shown with a plurality of orifices 52 which, together with the leakage area between of valve disk 44 and part of support plate 40 defining aperture 42, is sufficient to provide air flow during idle conditions with the valve disk in the fully "closed" position as depicted. Also shown in FIG. 2 in proximate relation to valve disk aperture 42 is a venturi aperture 54 in support plate 40 partial view only). Included in opposite ends of support plate 40 are first and second shaft apertures 56, 58 defining the axis of rotation 46 for valve disk 44.

Further in accordance with the present invention, the air valve assembly also has a first shall having one end section rotatably supported in the first aperture and having another end section connected to the valve disk; a second shaft having one end section rotatably supported in and extending through the second shaft aperture and with a bearing end terminating outside the support plate, and also having another end section connected to the valve disk. As embodied herein, and with continued reference to FIG. 2, a first shaft 60 is provided having an end section 62 connected to valve disk 44 and an opposing end section 64 rotatably supported in first shaft aperture 56, such as by a bearing sleeve 66. First shaft 60 terminates within the support plate 40 and the end of shaft aperture 56 is closed off to the atmosphere using a threaded screw seal 68. A second shaft 70 is provided having an end section 72 connected to valve disk 44 and having an opposed end section 74 rotatably supported in second shaft aperture 58 such as by a bearing sleeve 76. Also, opposed shaft end section 74 extends through aperture 58 and terminates outside the support plate 40 at bearing end 78.

Further in accordance with the present invention, the assembly includes an actuator shaft having an engagement end in axial abutting contact with the second shaft bearing end; and a coupling interconnecting the second shaft and the actuator shaft for transmitting precise rotary motion therebetween, the coupling having high torsional rigidity and low axial rigidity. With continued reference to FIG. 2, an armature shaft 80 is provided having a flanged engagement end 82 in abutting contact with bearing end 78 of second shaft 70. A coupling comprising three leaf spring elements 84 (only one being shown in the FIG. 2 schematic) interconnects second shaft 70 and actuator shaft 80 for providing high torsional rigidity while providing for relatively low axial rigidity. That is, leaf spring elements 84 are configured to prevent any significant rotational "play" or backlash between the angular movements of actuator shaft 80 and the angular response of second shaft 70, while permitting limited axial bending between second shaft end 78 and actuator shaft engagement end 82 for purposes of ensuring sealing face alignment (to be discussed henceforth) while accommodating thermal induced movements etc.

Further in accordance with the present invention, the assembly has a coupling housing surrounding the coupling, the second shaft bearing end, and the actuator shaft engagement end, and has an actuator shaft aperture through which the actuator shaft extends, and a seal disposed between the actuator shaft engagement end and the housing for preventing air flow past the actuator shaft through the actuator shaft aperture. Preferably, the coupling is a bellows or a plurality of leaf springs. Also in accordance with the present invention, it is preferred that the actuator engagement end is flanged and that the seal is an annular face seal between the flanged end and the housing surrounding the actuator shaft aperture. It is still further preferred that the assembly include means biasing the second shaft bearing end into engagement with the actuator shaft end and, for a flanged actuator shaft end and annular face seal, biasing the flanged end against the face seal. It is also preferred that the assembly includes means for angularly preloading the second shaft about the axis, of rotation.

Figure 2:
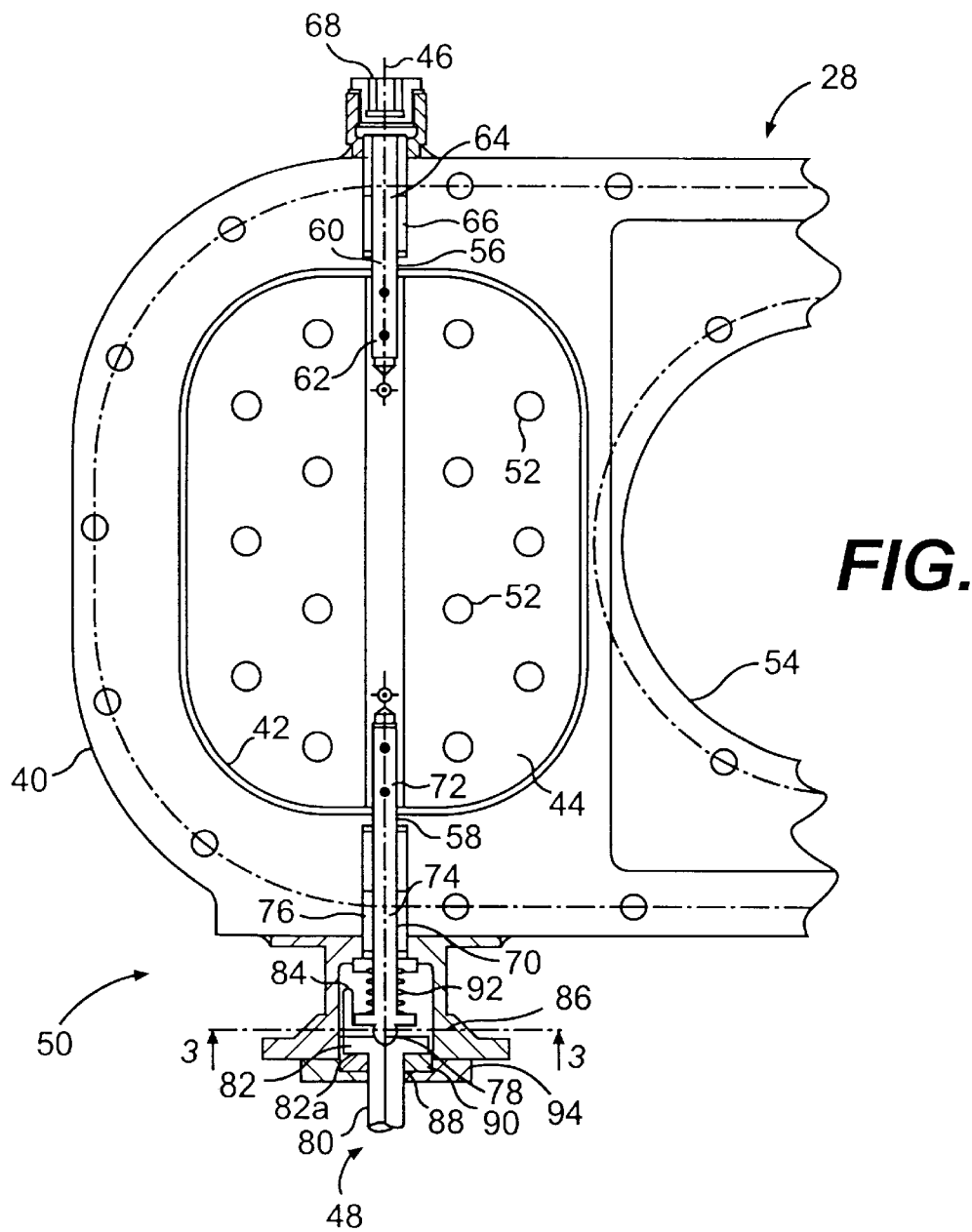
FIG. 2 is a cross-section of an assembly in accordance with the present invention.
Figure 3:
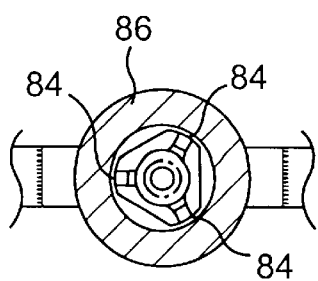
FIG. 3 is a cross-section of FIG. 2.

As embodied herein, and with continued reference to FIG. 2 as well as FIG. 3, a coupling housing 86 is provided to surround second shaft bearing end 78, actuator shaft engagement end 82, and leaf springs 84. Housing 86 is provided with an aperture 88 through which actuator shaft 86 extends to be connected to a source of rotary motion (not shown). Also, disposed between housing 86 and an annular face 82a of actuator shaft engagement end 82 is a face seal 90 which is preferably made of a high temperature material with a low coefficient of friction. Suitable materials are carbon and, for high temperature applications, ceramics such as Sialon™, but other materials are possible given the functional requirements of the face seal. Importantly, because of the axial bending permitted by the "split shaft" abutting contact between second shaft bearing end 78 and actuator shaft engagement end 82, face 82a can be maintained parallel to the sealing surface of the face seal 90 to ensure sealing contact about the periphery of actuator shaft 80.

Still further, a spring 92 disposed between housing 86 and second shaft bearing end 78 may be provided and configured to bias bearing end 78 into a positive abutting engagement with actuator shaft engagement end 82. The resulting positive engagement ensures adequate preload between actuator shaft engagement end 82 and face seal 90 and also allows the axial position of valve disk 44 to be accurately determined based on the dimensions of the coupling housing 86, actuator shaft engagement end 82, and face seal 90. End cap 94 of coupling housing 86 can be made axially adjustable, such as by a threaded sealing attachment, to position face seal 90 and actuator shaft engagement end 82 relative to the support plate 40 to ensure accurate positioning of valve disk 44.

Also, suitable cooling fin arrangements (not shown) can be provided on actuator shaft 80 to help dissipate heat flowing along actuator shaft 80.

Figure 4:
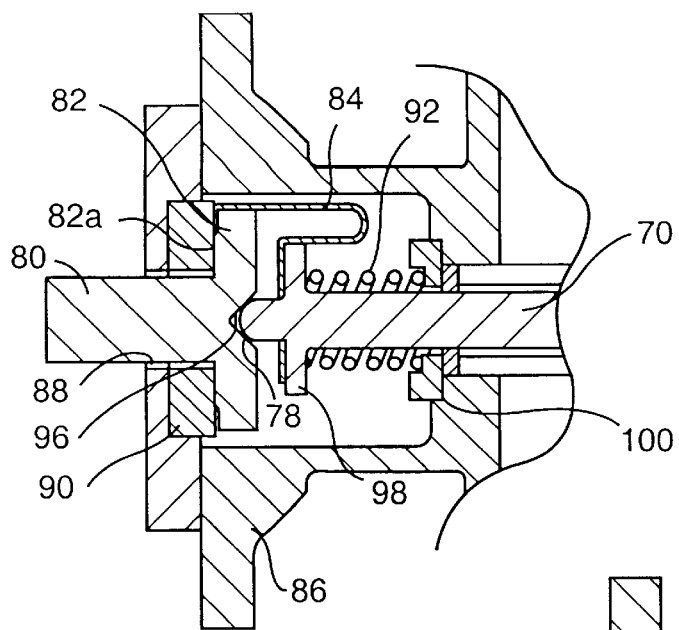
FIG. 4 is an enlarged cross-section of a portion of the assembly shown in FIGS. 2 and 3.
Figure 5:
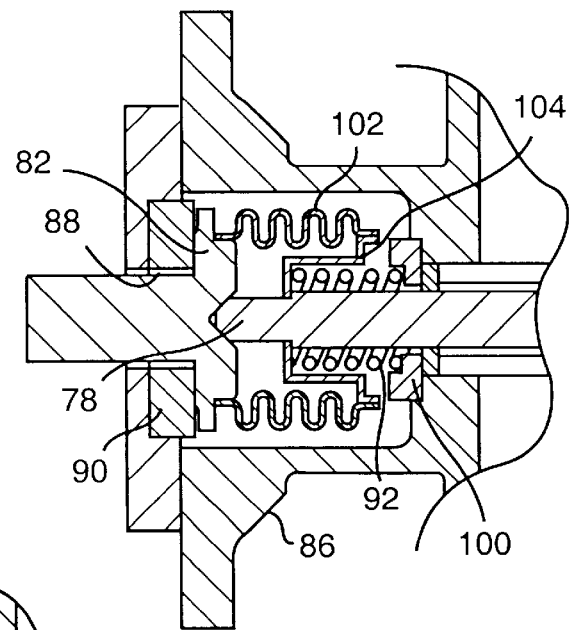
FIGS. 5, 6 and 7 are variations of the assembly portion shown in 4.
Figure 6:
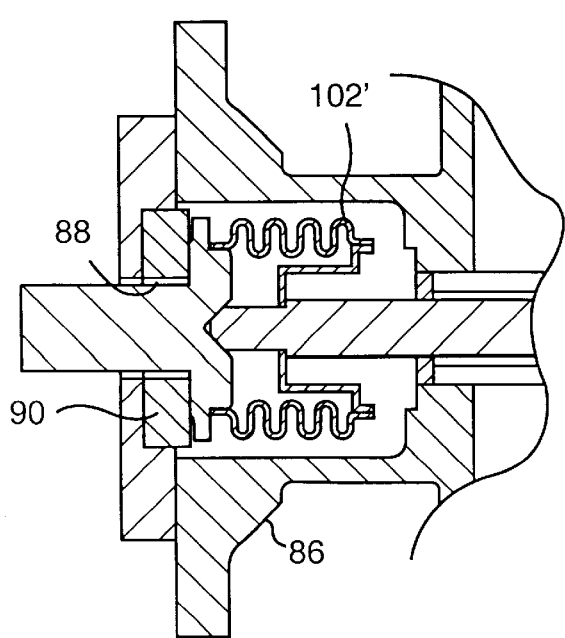

With reference now to FIGS. 4-6, FIG. 4 is an enlarged view of a portion of FIG. 2, which utilizes three angularly spaced leaf springs 84 to provide torsional coupling between second shaft 70 and actuator shaft 80. Preferably, actuator shaft engagement end 82 is provided with a conically-shaped pilot hole 96 for receiving bearing end 78 of which can be made rounded. As also can be seen in FIG. 4, second shaft 70 can be provided with a flange 98 for abutting one end of coiled compression spring 92 and a spring seat 100 can be provided in housing 86 for capturing the other end of coiled spring 92. FIG. 5 depicts a variation of the embodiment shown in FIGS. 2 and 4 wherein the leaf spring coupling is replaced with a bellows coupling 102 and the second shaft flange 98 is replaced with a cup member 104. In the variation shown in FIG. 5, the principal preload or seating force between second shaft bearing end 78 and actuator shaft engagement end 82 is still provided by coil spring 92 with a bellows 102, providing little or no bias force. In comparison, the further variation depicted schematically in FIG. 6 can utilize a spring-like bellows member 102' having a high spring constant and preloaded to provide a strong contracting force enabling the elimination of a separate coiled spring member.

Figure 7:
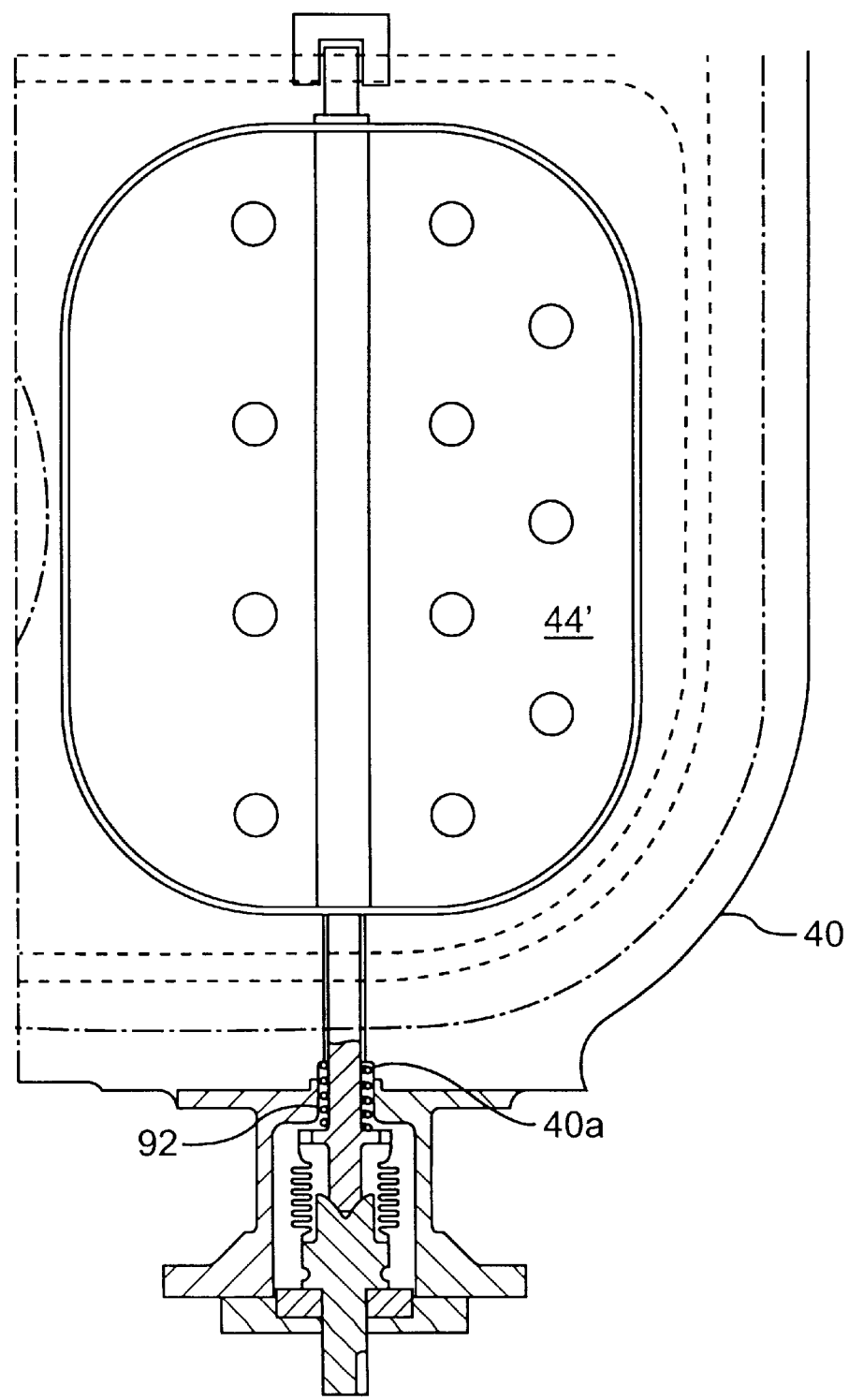

FIG. 7 is similar to the variation in FIG. 5, but coiled spring 92 is seated directly in a recessed portion 40a of valve support plate 40 and spring seat 100 is eliminated. Also, the aerodynamic resistance of the "wings" of valve disk 44' are deliberately unbalanced such as by providing a different number of orifices 52 on one "wing" of valve disk 44' as compared to the other. This imbalance will cause a small net torque on the disk to angularly preload the shaft assembly and is expected to further reduce unwanted angular "play" between actuator shaft 80 and second shaft 70. Unbalanced aerodynamic resistance can also be achieved by configuring the "wings" with different planar areas, thicknesses (i.e., weights), or orifice hydraulic resistances (e.g., diameter, entrance/exit losses, etc.) Also, more conventional techniques for angularly preloading the shaft assembly, such as torsional springs, could of course be used.

In each of the variations shown, a biasing force is provided to ensure an adequate sealing force between sealing face 82a of actuator shaft engagement end 82 and face seal 90 under all engine operating conditions, from idle to full power. The seal will prevent heated compressed air from escaping past actuator shaft 80 through aperture 88, which leakage would reduce engine thermal efficiency and possibly create a safety hazard.

It will be apparent to those skilled in the art that modifications and variations can be made in the above-described embodiments of the present invention without departing from the scope or spirit of the invention. Thus, it is intended that the present invention cover such modifications and variations provided they come within the scope of the appended claims and their equivalents.

What is claimed is:

1. Air valve assembly comprising:

a valve disk;

a support plate having a valve aperture in which said valve disk is disposed for rotation, said support plate also having aligned first and second shaft apertures through opposing support plate ends defining the axis of rotation of said valve disk;

a first shaft having one end section rotatably supported in said first aperture and having another end section connected to said valve disk;

a second shaft having one end section rotatably supported in and extending through said second aperture and with a bearing end terminating outside said support plate, and also having another end section connected to said valve disk;

an actuator shaft having an engagement end in axial abutting contact with said second shaft bearing end;

a coupling interconnecting said second shaft and said actuator shaft for transmitting rotary motion therebetween, said coupling having substantially high torsional rigidity and substantially low axial rigidity;

a coupling housing surrounding said coupling, said second shaft bearing end, and said actuator shaft engagement end, and having an actuator shaft aperture through which said actuator shaft extends; and a seal disposed between said actuator shaft engagement end and said housing.

2. The air valve assembly as in claim 1, wherein said coupling comprises a bellows.

3. The air valve assembly as in claim 1, wherein said coupling comprises a plurality of leaf springs.

4. The air valve assembly as in claim 1, further comprising a spring member biasing said bearing end into engagement with said actuator shaft engagement end.

5. The air valve assembly as in claim 1, further comprising a tapered pilot hole in said actuator shaft engagement end configured to pivotally receive said second shaft bearing end.

6. The air valve assembly as in claim 1, wherein said actuator shaft end has a flange, and wherein said seal is a face seal disposed between said flange and a housing portion surrounding said actuator shaft aperture.

7. The air valve assembly as in claim 6, further including a spring member biasing said flange against said face seal.

8. The air valve assembly as in claim 1, further including means to angularly preload said second shaft about said axis of rotation.

* * * * *